3,533,973
POLYESTER POLYCONDENSATION IN THE PRESENCE OF A CATALYTIC AMOUNT OF A TRIVALENT ALUMINUM SALT
Mary J. Stewart, Media, and John A. Price, Swarthmore, Pa., assignors to FMC Corporation, Philadelphia, Pa., a corporation of Delaware
No Drawing. Filed Nov. 4, 1968, Ser. No. 773,303
Int. Cl. C08g 17/015
U.S. Cl. 260—22                                    9 Claims

ABSTRACT OF THE DISCLOSURE

Process for preparing linear polyesters comprising carrying out an ester-interchange reaction between a diol and a lower dialkyl ester of a saturated aromatic dicarboxylic acid or carrying out a direct esterification reaction between a diol and a saturated aromatic dicarboxylic acid and then polycondensing the reaction product thereof in the presence of a trivalent aluminum salt selected from the group consisting of aluminum oxalate, aluminum benzoate, aluminum formate, aluminum octoate, aluminum citrate, and basic aluminum acetate.

---

This invention relates to an improved method for the preparation of linear polyesters. More particularly, it relates to an improved polycondensation catalyst for use in the manufacture of highly polymeric linear polyesters.

It is known that linear polyesters can be prepared from a suitable ester of a dicarboxylic acid or a dicarboxylic acid by initially reacting such a material with a diol. When an ester of a dicarboxylic acid is used as a starting material, it is first reacted with a diol in the presence of a transesterification catalyst by means of an ester-interchange reaction; whereas, when a dicarboxylic acid is used as a starting material, it is first subjected to a direct esterification reaction with a diol in the presence of what is generally called a first stage catalytic additive or ether inhibitor. In either instance, the resulting reaction product which may be, in general, described as a polyester prepolymer, is then polycondensed in the presence of a polycondensation catalyst to form a polyester resin.

In the case of the transesterification method of preparing polyethylene wherein ethylene glycol is reacted with dimethyl terephthalate, the first stage product of the transesterification reaction is generally described as being comprised mainly of bis(2-hydroxyethyl) terephthalate. Whereas, the first stage reaction product of the direct esterification reaction between ethylene glycol and terephthalic acid is comprised of bis(2-hydroxyethyl) terephthalate along with substantial quantities of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis(2-hydroxyethyl) terephthalate of a polycondensation product thereof, wherein the D.P. (degree of polymerization) varies from about 2 to about 6. However, for purposes of simplicity in describing the present invention, hereinafter the terms "polyester prepolymer" and "bis (2-hydroxyethyl terephthalate" will both denote and include within their scope the product of the direct esterification reaction between terephthalic aicd and ethylene glycol and the product of the transesterification reaction between dimethyl terephthalate and ethylene glycol as set forth above.

Heretofore, various materials have been suggested as polycondensation catalysts for polycondensing the polyester prepolymer products of both the transesterification method and direct esterification method of preparing polyester resins. However, in general, none of the substances that have been suggested as polycondensation catalysts heretofore have been completely satisfactory. For example, many of the polycondensation catalysts of the prior art only catalyze the condensation reaction to a low degree and they do not promote the reaction rate sufficiently to be acceptable for commercial purposes. Other known polycondensation catalysts tend to produce resin products having a poor color value. Therefore, such polycondensation catalysts of the prior art do not act to form polyester products having good, near white, color, carboxyl contents as low as required for some resin uses, or molecular weights and melting points as high as desired.

From a commercial standpoint, it is essential that a polyester resin be produced in the shortest possible time and the desired degree of polymerization be obtained. A polyethylene terephthalate resin suitable for melt spinning should have a carboxyl content value of about below 50 equivalents per million grams (eq./$10^6$ gr. or meq./kg.), a birefringent melting point of about at least 258–260° C., and an intrinsic viscosity preferably not less than about 0.60 (determined in a 60% phenol and 40% tetrachloroethane solution, wt./wt., at 30° C.), in order for the filaments formed therefrom to possess a satisfactory level of hydrolytic stability, thermal stability, ultraviolet light stability and a high degree of tenacity which is necessary for the use of such filaments in the manufacture of fibers such as is used in wash and wear clothing. It is desirable to manufacture polyester resins which have carboxyl contents as close to zero as possible, because there is a generally recognized direct relationship between the carboxyl content of the polyester resin and the hydrolytic, thermal, and ultraviolet light stability of the filaments and films produced therefrom. In general, the higher the carboxyl content of the polyester resin, the less hydrolytic, thermal, and ultraviolet light stability is possessed by the resulting films or filaments.

It is an object of the present invention to prepare highly polymeric linear polyesters by a direct esterification reaction between a dicarboxylic acid and a diol or by an ester-interchange reaction between an ester of a dicarboxylic acid and a diol, so as to form a polyester prepolymer and the polycondensation of the said polyester prepolymer in the presence of an improved polycondensation catalyst.

It is another object of the present invention to prepare a highly polymeric linear polyester resin by polycondensing bis(2-hydroxyethyl) terephthalate in the presence of an improved polycondensation catalyst.

These and other objects are accomplished in accordance with the present invention which involves a method for preparing highly polymeric linear polyesters wherein a lower dialkyl ester of an aromatic dicarboxylic acid is reacted with a diol in the presence of an ester-interchange catalyst to form a polyester prepolymer or where a saturated aromatic dicarboxylic acid is reacted with a diol in the presence of a first stage additive to form a polyester prepolymer and where the resulting polyester prepolymer is polycondensed in the presence of a polycondensation catalyst, the improvement comprising carrying out the polycondensation of the polyester prepolymer in the presence of a catalytic amount of a trivalent aluminum salt selected from the group consisting of aluminum oxalate, aluminum benzoate, aluminum formate, aluminum octoate, aluminum citrate, and basic aluminum acetate.

The terms "saturated aromatic dicarboxylic acid" and "lower dialkyl ester of a saturated aromatic dicarboxylic acid" are used herein to denote dicarboxylic acids or esters thereof which do not contain any olefinic unsaturation. In accordance with the present invention, any of the well known saturated dicarboxylic acids or their esters can be used in the present method. For example, among those which can be used are isophthalic acid and terephthalic acid.

The term "diol" is used herein to denote glycols of the series $HO(CH_2)_nOH$ wherein $n$ is 2 to 10.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.5:1 to about 2.6:1. The transesterification reaction is generally carried out at atmospheric pressure in an inert atmosphere such as nitrogen, initially at a temperature range of from about 125° C. to about 250° C. but preferably between about 150° C. and 200° C. in the presence of a transesterification catalyst. During the first stage of this reaction, methyl alcohol is evolved and is continuously removed by distillation. After a reaction period of about one to two hours, the temperature of the reaction mixture is raised to from about 200° C. to about 300° C. for approximately one to three hours in order to complete the reaction so as to form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similarly, the preparation of polyester resins via the direct esterification reaction is generally carried out with a molar ratio of glycol, such as ethylene glycol, to a dicarboxylic acid, such as terephthalic acid, of from about 1:1 to about 15:1, but preferably about 1.5:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate or triethylamine may be used. The first stage catalytic additives are generally used in concentrations ranging from $5 \times 10^{-5}$ mole to about $5 \times 10^{-2}$ mole of catalytic additive per mole of terephthalic acid present in the initial terephthalic acid-glycol reaction mixture.

The polycondensation step of the present invention is accomplished by adding a trivalent aluminum salt of the present method to a polyester prepolymer or bis(2-hydroxyethyl) terephthalate and heating the blend thereof under reduced pressure within the range of from about 0.05 mm. to 20 mm. of mercury while being agitated at a temperature of from about 260° C. to about 325° C. for from two to four hours.

The polycondensation catalysts of the present invention are generally employed in amounts ranging from about 0.01% to about 0.2%, based on the weight of the polyester prepolymer to be polycondensed. Usually, it has been found that from about 0.01% to about 0.1% is preferred in most instances. Higher or lower concentrations of the present polycondensation catalysts can also be used in the subject polycondensation reaction. However, when concentrations less than the above are used, their effectiveness is generally reduced, whereas if concentrations greater than this are used, no further improvement in the present method or desired product is generally obtained.

In order to illustrate the excellent color of the resin which is obtained by using the method of the present invention, the reflectance of the resins produced in the following examples were measured by a "Color-Eye" (Model D-1), which is the trade name for a differential colorimeter manufactured by the Instrument Development Laboratories, Attleboro, Mass. The color values obtained are based on luminance (Y on the C.I.E. system), which is a measurement of the proportion of the incident light reflected and therefore a measure of the whiteness or lightness of the polyester polymer being evaluated. The determination of Y on the C.I.E. system, as hereinafter set forth, was determined by using a molded plaque of the polyester resin product having the dimensions 1" x 1" x $\frac{1}{16}$". According to the C.I.E. system, polyester resins exhibiting the higher Y values are those which are whiter in color. Therefore, it is obvious that polyester resins exhibiting a higher Y value are preferred.

The following examples of several preferred embodiments will further serve to illustrate the present invention. All parts are by weight unless otherwise indicated.

EXAMPLE I

A mixture comprising 600 grams of dimethyl terephthalate, 396 grams of ethylene glycol, and 0.24 gram of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and excess ethylene glycol and form the polyester prepolymer comprised mainly of bis-(2-hydroxyethyl) terephthalate. The prepolymer product was allowed to cool under an atmosphere of nitrogen.

EXAMPLE II

Fifty grams of the prepolymer product of Example I was mixed with 0.02 gram of aluminum oxalate and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.70, a carboxyl content value of 11 (meq./kg.) and a melting point of about 262° C. The Y value on the C.I.E. system was 72.9.

EXAMPLE III

Fifty grams of the prepolymer product of Example I was mixed with 0.02 gram of aluminum benzoate and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.80, a carboxyl content value of 7 (meq./kg.) and a melting point of about 265° C. The Y value on the C.I.E. system was 69.2.

EXAMPLE IV

Fifty grams of the prepolymer product of Example I was mixed with 0.02 gram of aluminum formate and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.85, a carboxyl content value of 12 (meq./kg.) and a melting point of about 266° C. The Y value on the C.I.E. system was 60.6.

EXAMPLE V

Fifty grams of the prepolymer product of Example I was mixed with 0.02 gram of aluminum octoate and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.78, a carboxyl content value of 9 (meq./kg.) and a melting point of about 263° C. The Y value on the C.I.E. system was 71.7.

EXAMPLE VI

Fifty grams of the prepolymer product of Example I was mixed with 0.02 gram of aluminum citrate and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.63, a carboxyl content value of 6 (meq./kg.) and a melting point of about 262° C. The Y value on the C.I.E. system was 66.7.

EXAMPLE VII

Fifty grams of the prepolymer product of Example I was mixed with 0.02 gram of basic aluminum acetate and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.66, a carboxyl content value of 9 (meq./kg.) and a melting point of about 264° C. The Y value on the C.I.E. system was 70.3.

EXAMPLE VIII

Fifty grams of the prepolymer product of Example I was mixed with 0.02 gram of antimony trioxide and placed in a reaction vessel. This mixture was heated at about 280° C. under reduced pressure of from about 0.05 to about 0.1 mm. of mercury while under agitation for about two hours to bring about polycondensation of the prepolymer product of Example I and formation of a polyester resin. The polyester resin product had an intrinsic viscosity of 0.81, a carboxyl content value of 18 (meq./kg.) and a melting point of about 260° C. The Y value on the C.I.E. system was 56.5.

EXAMPLE IX

A blended mixture comprising 474 grams of terephthalic acid, 288 mls. of ethylene glycol, and 149 mls. of triethylamine was charged into a reaction vessel equipped with a nitrogen inlet, a Dean-Stark separating apparatus, heating means, and stirring means. The reaction mixture was agitated and the temperature was raised to about 197° C. under a nitrogen blanket at atmospheric pressure. At about 190° C. a water-triethylamine azeotropic mixture started to distill off. The azeotropic mixture was continuously separated by means of the Dean-Stark apparatus, and the triethylamine recovered was continuously returned to the reaction vessel. The reaction mixture became almost clear. Then the temperature was allowed to rise to about 230° C. over a one hour period to form a polyester prepolymer. The prepolymer product was allowed to cool under an atmosphere of nitrogen.

EXAMPLE X

Fifty grams of the prepolymer product of Example IX was mixed with 0.02 gram of aluminum oxalate and placed in a reaction vessel. This mixture was heated at about 280° C. under reduced pressure of from about 0.05 to about 0.1 mm. of mercury while under agitation for about three hours to bring about polycondensation of the prepolymer product of Example IX and formation of a polyester resin. The resin product had an intrinsic viscosity of 0.73, a carboxyl content of 8 (meq./kg.) and a melting point of 266° C. The Y value on the C.I.E. system was 59.9.

EXAMPLE XI

Fifty grams of the prepolymer product of Example IX was mixed with 0.02 gram of antimony trioxide and placed in a reaction vessel. This mixture was heated at about 280° C. under reduced pressure of from about 0.05 to about 0.1 mm. of mercury while under agitation for about two hours to bring about polycondensation of the prepolymer product of Example IX and formation of a polyester resin. The resin product had an intrinsic viscosity of 0.67, a carboxyl content of 7 (meq./kg.) and a melting point of 262° C. The Y value on the C.I.E. system was 62.6.

The intrinsic viscosity of the polyester resin products of the above examples were measured in a 60% phenol-40% tetrachloroethane solution (wt./wt.) at 30° C. The other analytical values expressed were obtained by conventional laboratory procedures.

The results in the above examples indicate that the subject trivalent aluminum salts in general facilitate the preparation of and enhance the polyester resins produced. Through the use of the present method, polyester resins are obtained which are characterized by low carboxyl values, high melting points, high molecular weights as indicated by the intrinsic viscosity values, and improved color.

It is to be noted that all of the resins produced in the above examples wherein a two hour polycondensation reaction was carried out, exhibited substantially improved color over their corresponding control represented by Example VIII.

The polymerization cycle of Example X was carried out for three hours for illustration purposes. Despite this ⅓ increase in exposure to high temperatures, the resulting polymer was quite close in whiteness to that of the resin prepared in the corresponding two-hour polycondensation control Example XI. Like Examples II to VII, the resin prepared in Example X exhibited a good carboxyl value, a very high melting point and a suitably high intrinsic viscosity.

We claim:

1. In a process of preparing linear polyesters wherein a lower dialkyl ester of a saturated aromatic dicarboxylic acid is reacted with a glycol containing 2 to 10 carbon atoms in the presence of an ester-interchange catalyst to form a polyester prepolymer or where a saturated aromatic dicarboxylic acid is reacted with a glycol containing 2 to 10 carbon atoms in the presence of a first stage catalystic additive to form a polyester prepolymer and where the resulting polyester prepolymer is then polycondensed in the presence of a polycondensation catalyst, the improvement comprising carrying out the polycondensation of the said polyester prepolymer in the presence of a catalytic amount of a trivalent aluminum salt selected from the group consisting of aluminum oxalate, aluminum benzoate, aluminum formate, aluminum octoate, aluminum citrate, and basic aluminum acetate.

2. The process of claim 1 wherein the trivalent aluminum salt is present in a concentration within a range from about 0.01% to about 0.2% based on the weight of the polyester prepolymer.

3. The process of claim 1 wherein the trivalent aluminum salt is aluminum oxalate.

4. The process of claim 1 wherein the trivalent aluminum salt is aluminum benzoate.

5. The process of claim 1 wherein the trivalent aluminum salt is aluminum formate.

6. The process of claim 1 wherein the trivalent aluminum salt is aluminum octoate.

7. The process of claim 1 wherein the trivalent aluminum salt is aluminum citrate.

8. The process of claim 1 wherein the trivalent aluminum salt is basic aluminum acetate.

9. The process of claim 1 wherein the said polyester prepolymer is bis(2-hydroxyethyl) terephthalate.

References Cited

UNITED STATES PATENTS

| | | | |
|---|---|---|---|
| 2,345,700 | 4/1944 | Dreyfus | 260—78 |
| 2,850,483 | 9/1958 | Ballentine et al. | 260—75 |
| 3,220,982 | 11/1965 | Advani | 260—75 |
| 3,377,319 | 4/1968 | Wiener | 260—75 |
| 3,386,960 | 4/1968 | Wiener | 260—75 |
| 3,420,801 | 1/1969 | Fitz | 260—75 |
| 3,425,994 | 2/1969 | Fitz | 260—75 |
| 3,438,944 | 4/1969 | Stewart et al. | 260—75 |

DONALD E. CZAJA, Primary Examiner

R. W. GRIFFIN, Assistant Examiner

U.S. Cl. X.R.

8—179; 260—75